(12) United States Patent
Ieki

(10) Patent No.: US 8,097,353 B2
(45) Date of Patent: Jan. 17, 2012

(54) POWER GENERATION SYSTEM

(75) Inventor: Koji Ieki, Fuchu (JP)

(73) Assignee: Casio Computer Co., Ltd, Tokyo (JP)

( * ) Notice: Subject to any disclaimer, the term of this patent is extended or adjusted under 35 U.S.C. 154(b) by 160 days.

(21) Appl. No.: 12/070,516

(22) Filed: Feb. 19, 2008

(65) Prior Publication Data

US 2008/0206629 A1    Aug. 28, 2008

(30) Foreign Application Priority Data

Feb. 27, 2007   (JP) .................. 2007-046906

(51) Int. Cl.
*H01M 2/10* (2006.01)
(52) U.S. Cl. .......................... 429/97; 429/100
(58) Field of Classification Search ............. 429/97
See application file for complete search history.

(56) References Cited

U.S. PATENT DOCUMENTS

| 6,725,151 B2 * | 4/2004 | Itou ........................ 701/123 |
| 2006/0127733 A1 * | 6/2006 | Kaschmitter et al. ........ 429/34 |

FOREIGN PATENT DOCUMENTS

| JP | 2003-045468 A | | 2/2003 |
| JP | 2003045468 A | * | 2/2003 |

* cited by examiner

*Primary Examiner* — Patrick Ryan
*Assistant Examiner* — Brent Thomas
(74) *Attorney, Agent, or Firm* — Holtz, Holtz, Goodman & Chick, PC

(57) ABSTRACT

Disclosed is a power generation system including an attachment part to attach a fuel container which stores a fuel, a lock mechanism to detect a lock or a lock release of the fuel container which is attached to the attachment part and a data recording unit to record a data in a storage medium provided at the fuel container based on a detection of the lock release by the lock mechanism before the fuel container is detached from the attachment part.

15 Claims, 11 Drawing Sheets

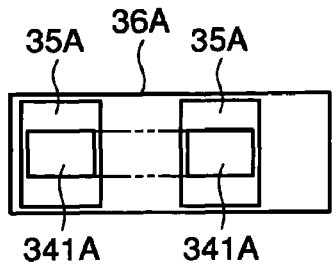
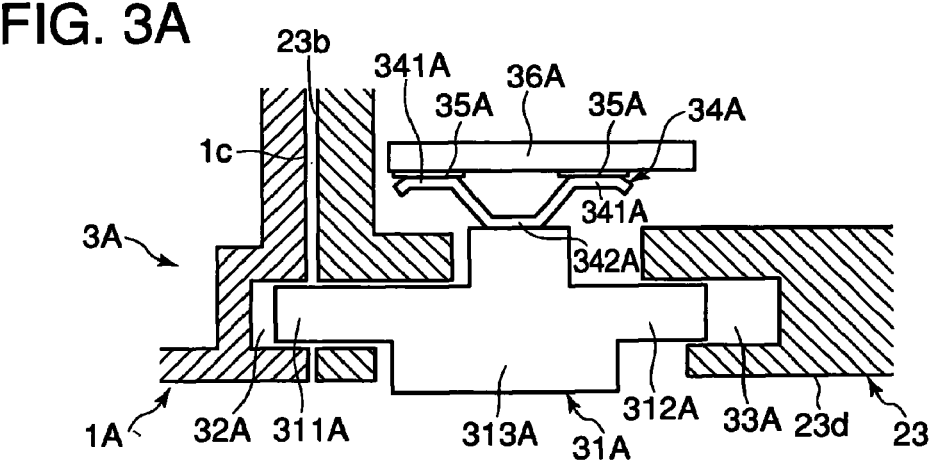
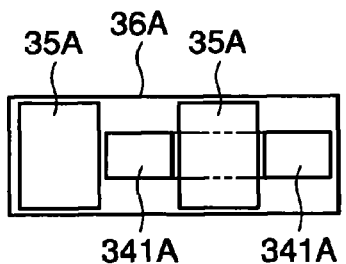
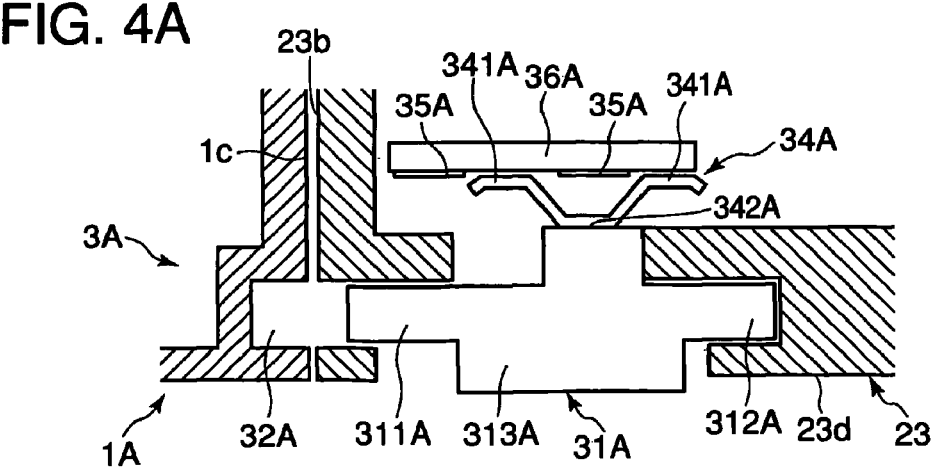

POWER GENERATION SYSTEM

BACKGROUND OF THE INVENTION

1. Field of the Invention

The present invention relates to a power generation system in which an interface with a fuel container is provided.

2. Description of Related Art

In recent years, small size electronic devices such as a cell phone, a notebook type personal computer, a digital camera, a watch, a PDA (Personal Digital Assistance), an electrical planner and the like are achieving remarkable progress and development. Primary batteries such alkaline batteries, manganese batteries or the like or secondary batteries such as nickel-cadmium batteries, nickel-hydrogen batteries, lithium ion batteries or the like is used as the power source of the electronic devices. Today, research and development relating to fuel cells which can realize high energy use efficiency is carried out actively for an alternative of the primary batteries and the secondary batteries.

The fuel cells convert chemical energy into electric energy by allowing the fuel and oxygen to react electrochemically. In fuel cells, water is generated as a by-product of the reaction and is discharged because the fuel cells use the electrochemical reaction in which the chemical energy of the fuel is directly converted into the electric energy.

It is known to have a structure in which the fuel cartridge can be reused by storing the data such as the remaining amount in the fuel cartridge, the number of times of attachment to the fuel cell module and the like in the IC chip as disclosed in JP2003-45468A.

SUMMARY OF THE INVENTION

When the IC chip is installed as described in the above JP2003-45468A, there may be a case where the updated data cannot be written when the fuel cartridge is removed intentionally while the fuel cell module is activated. The data of the fuel cartridge can be written in the IC chip at every certain time. However, because the timing when the fuel cartridge is to be detached is not known, the writing needs to be carried out all the time in order to update the data to be written in the chip just before detaching the fuel cartridge. Therefore, there is a problem that the electricity is wasted by always carrying out the writing operation and the operation time of the fuel cell module is reduced.

In view of the above problem, the advantage of the present invention is that the updated data relating to the fuel and the like can be recorded in the fuel container efficiently in the power generation system.

In the present invention, a power generation system comprises an attachment part to attach a fuel container which stores a fuel, a lock mechanism to detect a lock or a lock release of the fuel container which is attached to the attachment part and a data recording unit to record a data in a storage medium provided at the fuel container based on a detection of the lock release by the lock mechanism.

The data may include as least one of a remaining amount data of the fuel in the fuel container, a data of number of times of attaching the fuel container and a data of date and time of using the fuel container.

The data recording unit may read the data from the storage medium provided at the fuel container.

The power generation system may further comprise a control circuit which stops a supply of the fuel from the fuel container by the lock mechanism detecting the lock release.

The lock mechanism may comprise a lock unit to lock the fuel container and a lock recognizing unit which allows the control circuit to recognize that the lock unit locks the fuel container.

The lock unit may comprise a connecting unit which is positioned at different positions between a case where the fuel container is locked and a case where the lock of the fuel container is released, and the lock recognizing unit may become in an electrically conductive condition with the connecting unit when the fuel container is locked by the lock unit and becomes in an electrically non-conductive condition with the connecting unit when the lock of the fuel container is released by the lock unit.

The lock unit may comprise a connecting unit which is positioned at different positions between a case where the fuel container is locked and a case where the lock of the fuel container is released, the lock recognizing unit may comprise a plurality of electrodes which are non-conductive with one another, and the connecting unit may make the plurality of electrodes be electrically conductive when the fuel container is locked by the lock unit and the connecting unit makes the plurality of electrodes be electrically non-conductive when the lock of the fuel container is released by the lock unit.

The lock mechanism may comprise an engaging hole and a lock unit to lock the fuel container by engaging with the engaging hole.

The power generation system may further comprise a control circuit which stops a supply of the fuel from the fuel container by the lock mechanism detecting the lock release, and the lock mechanism may comprise a lock unit to lock the fuel container and a lock recognizing unit which allows the control circuit to recognize that the lock unit locks the fuel container, the lock unit may be positioned at different positions between a case where the fuel container is locked and a case where the lock is released, the lock recognizing unit may become in either one of an electrically conductive condition and an electrically non-conductive condition according to the position of the lock unit, and the control circuit may detect whether the fuel container is locked or the lock is released by recognizing the conductive condition or the non-conductive condition of the lock recognizing unit.

The power generation system may further comprise a control circuit which stops a supply of the fuel from one fuel container among a plurality of the fuel containers, in which the lock release is detected by detecting the lock release by using the lock mechanism which corresponds to the one fuel container, and which supplies the fuel from another fuel container.

The power generation system may further comprise an electronic device.

A power generation system comprises an attachment part to attach a fuel container which stores a fuel, a lock unit to lock the fuel container to the attachment part, a lock release start recognizing unit which allows to recognize that the lock unit starts to release the lock of the fuel container and a data recording unit to record a data in a storage medium provided at the fuel container based on a lock mechanism detecting a start of the lock release by the lock release start recognizing unit after the lock release of the fuel container is started and before the lock release is completed.

The lock unit may comprise a connecting unit which is positioned at different positions between a case where the fuel container is locked and a case where the lock of the fuel container is started to be released, and the lock release start recognizing unit may become in an electrically conductive condition with the connecting unit when the fuel container is locked by the lock unit and becomes in an electrically non-conductive condition with the connecting unit when the lock of the fuel container is started to be released by the lock unit.

The lock unit may comprise a connecting unit which is positioned at different positions between a case where the fuel container is locked and a case where the lock of the fuel container is started to be released, the lock release start recognizing unit may comprise a plurality of electrodes which are non-conductive to one another, and the connecting unit may allow the plurality of electrodes be electrically conductive when the fuel container is locked by the lock unit and the connecting unit allows the plurality of electrodes be electrically non-conductive when the lock of the fuel container is started to be released by the lock unit.

The lock unit may lock the fuel container by engaging with an engaging hole.

The power generation system may further comprise an electronic device.

BRIEF DESCRIPTION OF THE DRAWINGS

FIG. 3A is an upper sectional view showing a locked state where a lock unit 31A of a lock mechanism 3A is engaged with the first fuel container 1A.

FIG. 3B is a front view showing a state where contact portions 341A and 341A of a connecting unit 34A are connected to the electrode 35A in the condition shown in FIG. 3A.

FIG. 4A is an upper sectional view showing a state where the lock of the first fuel container 1A is released by the lock unit 31A of the lock mechanism 3A.

FIG. 4B is a front view showing a state where the contact portions 341A and 341A of the connecting unit 34A are detached from the electrode 35A in the condition shown in FIG. 4A.

DETAILED DESCRIPTION OF THE INVENTION

Hereinafter, the best mode for carrying out the present invention will be described with reference to the drawings. However, the scope of the invention is not limited to the illustrated examples.

First Embodiment

Figure 1:
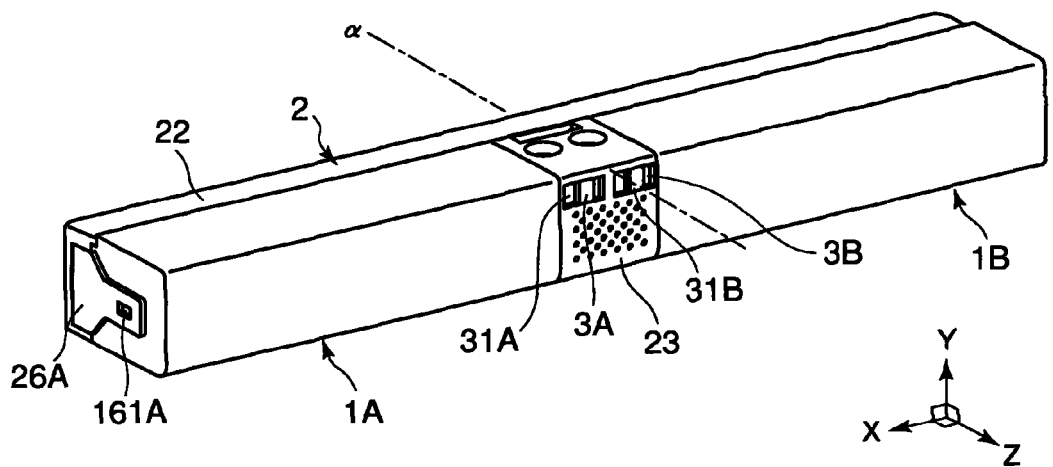
FIG. 1 is an outside perspective view showing a state where two fuel containers 1A and 1B are attached to a power generation module 2.
Figure 2:
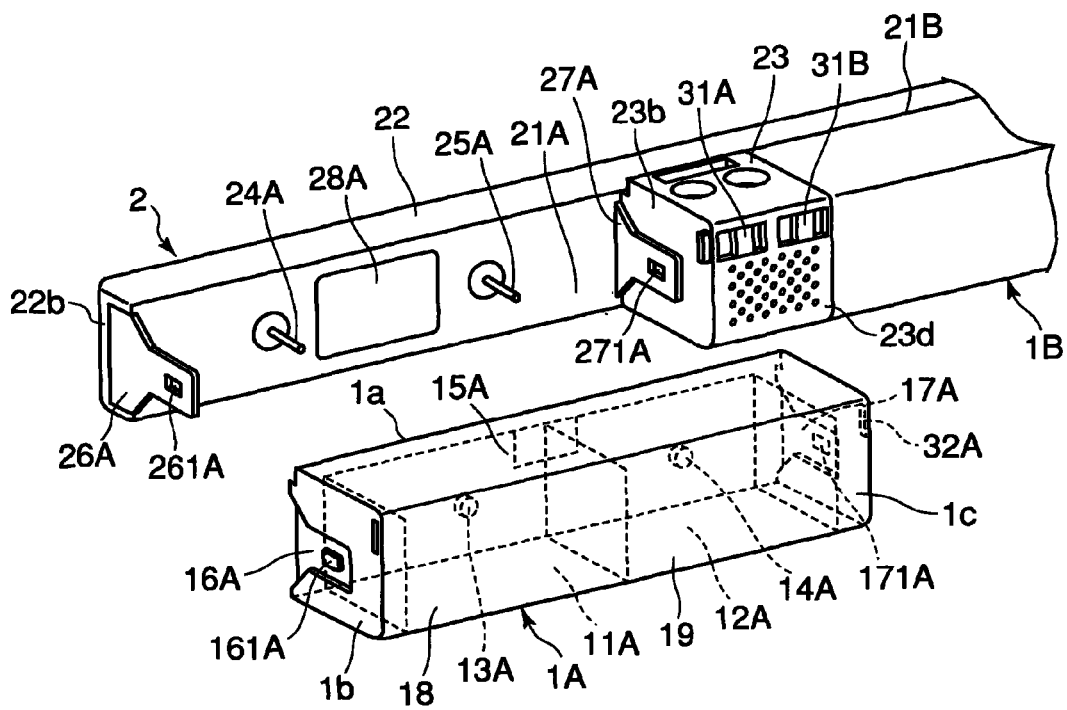
FIG. 2 is an outside perspective view showing a state where the fuel container 1A which is one of the fuel containers is detached from the power generation module 2.

FIG. 1 is an outside perspective view showing a state where two fuel containers 1A and 1B are attached to the power generation module 2 and FIG. 2 is an outside perspective view showing a state where the fuel container 1A which is one of the fuel containers is detached from the power generation module 2. In the following description, a left-right direction means the longitudinal direction of the power generation module 2 which is the X direction shown in FIG. 1, an up-down direction means the height direction of the power generation module 2 which is the Y direction shown in FIG. 1 and a front-rear direction means the width direction of the power generation module 2 which is the Z direction shown in FIG. 1. Here, the front surface and the back surface are based on the view when the power generation module 2 is seen from the direction of FIG. 1. Further, the two fuel containers (hereinafter, called the first fuel container 1A and the second fuel container 1B) have similar structure. Therefore, only the structure of the first fuel container 1A is described in the following description, and the alphabet letter B is attached to the same numbers for the second fuel container 1B which has a similar structure as the first fuel container 1A or which has a structure symmetrical to the first fuel container 1A, and the descriptions are omitted.

The first fuel container 1A is detachable from the power generation module 2, and comprises a fuel reservoir unit 11A to store the fuel 18 and a water reservoir unit 12A to store the water 19 which are constituted of two hollow spaces one in the right and the other in the left inside thereof.

The fuel 18 is mainly a simple chemical fuel or a mixture of chemical fuel and water. For example, alcohol such as methanol, ethanol or the like, ether such as dimethyl ether or the like, a compound including hydrogen atom in its composition such as gasoline can be used as the chemical fuel. As for the mixture of chemical fuel and water, a mixture in which methanol and water are equally mixed is used as the material for chemical reaction. In the embodiment, a chemical fuel such as methanol or the like is used.

The first fuel container 1A is a transparent or a translucent unit, and is constituted of a synthetic resin material such as a polyethylene, a polypropylene, a polycarbonate, an acrylic or the like, for example. On the back surface 1a of the fuel container 1A, the fuel discharge unit 13A which is provided on the back surface 1a side and penetrates the back surface 1a to communicate with the fuel reservoir 11A in which the fuel 18 is stored and which discharges the fuel 18 to the after mentioned power generation module 2 and the water discharge 14A which is provided on the back surface 1a side and penetrates the back surface 1a to communicate with the water reservoir unit 12A in which the water 19 is stored and which discharges the water 19 to the power generation module 2 are respectively formed one in the right and the other in the left. The fuel discharge 13A and the water discharge 14A are formed evenly with the back surface 1a so as not to protrude with respect to the back surface 1a.

A fuel outlet (omitted from the drawing) which is a through hole for discharging the fuel 18 in the fuel reservoir unit 11A is formed at the fuel discharge unit 13A, and a check valve (omitted from the drawing) for blocking the fuel from redundantly discharging outside from inside of the fuel reservoir unit 11A is fitted at the fuel outlet. Particularly, the check valve is a duck-bill valve in which a material having flexibility and elasticity is formed in a duck-bill shape, and the check valve is fitted in the fuel discharge unit 13A in a state where the tip of the duck-bill shape is facing inside of the fuel reservoir unit 11A. The ethylene-propylene-diene rubber (EPDM), a butyl rubber or the like is suggested as the material having flexibility and elasticity, and butyl rubber is preferably selected in practical use because butyl rubber generally exhibits low gas permeability among macromolecular elastic materials. Further, the volume of the check valve can be made small because it does not have a complicated mechanical structure, and the cost reduction can be attempted. Here, an insertion hole which allows inside of the fuel reservoir unit 11A to communicate with outside can be provided at the check valve in advance when the fuel supply unit 24A which is provided at the after mentioned power generation module 2 is inserted, or the structure may be such that the insertion hole is formed for the first time by inserting the fuel supply unit 24A. In a case where the insertion hole is provided in advance, a pressure is applied in the closing direction of the insertion hole at the periphery of the insertion hole by the inner pressure of the fuel 18 inside the fuel reservoir unit 11A when the fuel 18 is filled inside the fuel reservoir unit 11A. Therefore, the fuel 18 will not redundantly leak outside of the fuel container 1A from the insertion hole. The fuel 18 is discharged to the power generation module 2 from the fuel reservoir unit 11A via the fuel discharge unit 13A and the fuel supply unit 24A by the fuel supply unit 24A of the power generation module 2 being inserted in the fuel discharge unit 13A.

A water outlet (omitted from the drawing) which is a through hole for discharging the water 19 in the water reservoir unit 12A is formed at the water discharge unit 14A, and a check valve (omitted from the drawing) for blocking the water 19 from redundantly discharging outside from inside of the water reservoir unit 12A is fitted at the water outlet. The same check valve as the one provided at the above described fuel discharge unit 13A can be used here. The water 19 is discharged to the power generation module 2 from the water reservoir unit 12A via the water discharge unit 14A and the water supply unit 25A by the water supply unit 25A of the after mentioned power generation module 2 being inserted in the water discharge unit 14A.

On the back surface 1a of the first fuel container 1A, the IC (integrated circuit) chip 15A which is a storage medium is provided at the position corresponding to the IC chip interface (hereinafter, called the IC chip I/F 28A) which is provided at the attachment part 21A of the after mentioned power generation module 2. Data including at least either one of the remaining amount of the fuel 18 and the water 19 in the first fuel container 1A, the number of times of attachment, the date and time of use and the like is to be written and read in the IC chip 15A by the IC chip I/F 28A which is the data recording unit. Similarly, on the back surface 1b of the second fuel container 1B, the IC chip 15B which is the storage medium is provided at the position corresponding to the IC chip interface (hereinafter, called the IC chip I/F 28B) which is provided at the attachment part 21B of the after mentioned power generation module 2. Data such as the remaining amount of the fuel 18 and the water 19 in the second fuel container 1B, the number of times of attachment, the date and time of use and the like are to be written (recorded) and read in the IC chip 15B by the IC chip I/F 28B which is the data recording unit.

Moreover, on the right and left side surfaces 1b and 1c of the first fuel container 1A, a pair of groove portions 16A and 17A in which a pair of fixing parts 26A and 27A provided at the after mentioned power generation module 2 are respectively fitted are formed. Convex portions 161A and 171A which are respectively fitted in holes 261A and 271A formed at the fixed parts 26A and 27A are respectively formed at the groove portions 16A and 17A. Therefore, the first fuel container 1A is attached to the power generation module 2 by fitting the fixing parts 26A and 27A in the groove portions 16A and 17A of the first fuel container 1A, respectively, and by fitting the convex portions 161A and 171A in the holes 261A and 271A, respectively.

The power generation module 2 is detachably provided to the first fuel container 1A, and the power generation module 2 generates electricity by the fuel 18 and the water 19 being supplied from the first fuel container 1A. The attachment parts 21A and 21B where the first and the second fuel containers 1A and 1B are respectively attached are provided at the power generation module 2, one in the right and the other in the left. The power generation module 2 comprises a longitudinal unit 22 which extends along in a right-left direction of each fuel containers 1A and 1B and a shorter unit 23 which extends along in a front-rear direction of the first and the second fuel containers 1A and 1B at the right-left center position of the longitudinal unit 22, and the power generation module 2 is formed in a T-shape in a plan view.

The first fuel container 1A is attached at the attachment part 21A in the left side, and the second fuel container 1B is attached at the attachment part 21B in the right side. The second fuel container 1B is attached in the same direction as the first fuel container 1A. Therefore, at the left side portion and the right side portion of the power generation module 2 with respect to the right-left center line a of the shorter unit 23, the after mentioned fuel supply 24A and 24B, the water supply 25A and 25B, the lock mechanism 3A and 3B and the like are respectively provided at the position corresponding to the first or the second fuel container 1A or 1B which is respectively attached to the right and left side portions of the power generation module 2. Therefore, only the left side portion of the shorter unit 23 will be described in the following description, and the alphabet letter B is attached to the same numbers for the parts having the same structure as the left side portion, and the descriptions are omitted. Here, for the reasons of drawings, the fuel supply unit 24B and the water supply unit 25B are shown in the after mentioned FIGS. 5 to 7.

At the attachment part 21A, the fuel supply unit 24A to supply the fuel 18 to the power generation module 2 by being inserted in the fuel reservoir unit 11A and the water supply unit 25A to supply the water 19 to the power generation module 2 by being inserted in the water reservoir unit 12A are provided, one in the right and the other in the left, so as to correspond with the fuel discharge unit 13A and the water discharge unit 14A of the first fuel container 1A.

The fuel supply unit 24A is formed in a core-like shape, and a fuel supply unit which is made by carrying out the hydrophilizing process to a material having liquid absorbability with respect to the fuel 18, for example, the porous material in which the spherical powder of about 100 μm made of stainless steel such as SUS316 or the like is consolidated by sintering, is suggested. The water supply unit 25A is also formed in a core-like shape, and a water supply unit which is made of the above described material having liquid absorbability with respect to the water 19 is suggested.

At the attachment part 21A, the IC chip I/F 28A is provided between the fuel supply unit 24A and the water supply unit 25A at the position corresponding to the IC chip 15A of the first fuel container 1A which is to be attached. The IC chip I/F 28A detects whether the first fuel container 1A is attached or not by the IC chip 15A after the lock by the lock mechanism 3A is detected. Then, when the lock by the after mentioned lock mechanism 3A is detected and when the IC chip I/F 28A detects that the first fuel container 1A is attached to the attachment part 21A, the IC chip I/F 28A receives the signal of the after mentioned control circuit 47 (see FIG. 7) and reads the remaining amount data of the fuel 18 and the water 19 and the like of the first fuel container 1A which is stored in the IC chip 15A. Further, when the release of the lock by the lock mechanism 3A is detected and when the IC chip I/F 28A detects that the first fuel container 1A is attached to the attachment part 21A, the IC chip I/F 28A receives the signal of the control circuit 47 and writes the remaining amount data of the fuel 18 and the water 19 and the like of the first fuel container 1A in the IC chip 15A before the first fuel container 1A is detached from the attachment part 21A.

At the attachment part 21A, a pair of fixing parts 26A and 27A which are respectively fitted in the groove portions 16A and 17A which are formed on the right and left side surfaces 1b and 1c, one on the right side and the other on the left side, of the first fuel container 1A are formed. Further, the holes 261A and 271A which are respectively formed at the fixing parts 26A and 27A and in which the convex portions 161A and 171A respectively provided at the groove portions 16A and 17A are fitted are formed at the attachment part 21A. A pair of fixing parts 26A and 27A are respectively disposed on the left side surface 22b of the longitudinal unit 22 and the left side surface 23b of the shorter unit 23 so as to face one another, and are formed so that the narrow parts are protruded toward the fuel container 1A side. Here, the groove portions 16A and 17A correspond with the form of each fixing parts 26A and 27A, and the groove portions 16A and 17A are formed so as to be wider toward the power generation module 2 side so that the groove portions 16A and 17A can be easily inserted in the tips of the fixing parts 26A and 27A, respectively.

FIG. 3A is an upper sectional view showing a locked state where the lock unit 31A of the lock mechanism 3A is engaged with the first fuel container 1A, FIG. 3B is a front view showing a state where the contact portions 341A and 341A of the connecting unit 34A having a plate spring are connected to the electrode 35A in the condition shown in FIG. 3A, FIG. 4A is an upper sectional view showing a state where the lock of the first fuel container 1A is released by the lock unit 31A of the lock mechanism 3A and FIG. 4B is a front view showing a state where the contact portions 341A and 341A of the connecting unit 34A are detached from the electrode 35A in the condition shown in FIG. 4A.

At the shorter unit 23 of the power generation module 2, the lock mechanism 3A which makes the first fuel container 1A be fixable is provided. The lock mechanism 3A electrically detects the lock and the lock release of the attachment of the first fuel container 1A to the attachment part 21A. The lock mechanism 3A comprises the lock unit 31A which is provided on the front surface 23d of the shorter unit 23, the engaging hole 32A which is formed on the right side surface 1c of the first fuel container 1A and in which the lock unit 31A is engageable and the like.

The lock unit 31A is formed of a resin such as a polyacetal or the like having good slidability, and is fitted in the slide hole 33A which is formed by penetrating the front surface 23d and the left side surface 23b of the shorter unit 23 so as to move freely in the right and left directions. The lock unit 31A comprises two protrusions 311A and 312A which respectively protrude in the right and left and a knob 313A which is protruded from the front surface 23d and which is slidable by a user.

Moreover, the connecting unit 34A is fixed on the back surface of the lock unit 31A. The connecting unit 34A is made of metal in which gold plating is carried out, and is fixed by heat welding or the like. Further, the connecting unit 34A comprises two contact portions 341A and 341A which contact with the after mentioned electrodes 35A and 35A and the lock recognizing unit 36A having an insulated board and a joining unit 342A which joins the two contact portions 341A and 341A, which is formed in the lock unit 31A side in a convex shape and which is attached on the back surface of the lock unit 31A.

The lock recognizing unit 36A is disposed inside of the shorter unit 23, and the electrodes 35A and 35A which are separated so as to be electrically insulated to one another are fixed by having a predetermined space between one another on the lock recognizing unit 36A. The after mentioned control circuit 47 has a function to detect whether the electrodes 35A and 35A are in the insulated condition or in the conductive condition to one another. The control circuit 47 outputs a predetermined voltage to one of the electrodes 35A and 35A, and determines that the electrodes 35A and 35A are in the insulated condition when the other electrode 35A is floating, and determines that they are in the conductive condition when the other electrode 35A is equipotential with the electrode 35A in which the voltage is output. The connecting unit 34A which is fixed to the lock unit 31A can move freely in the right and left directions on the electrodes 35A and 35A and on the lock recognizing unit 36A between the electrodes 35A and 35A by the sliding movement of the lock unit 31A.

As shown in FIG. 3, the protrusion 311A in the left side of the lock unit 31A protrudes from the left side of the sliding hole 33A and the contact portions 341A and 341A of the connecting unit 34A contact with the electrodes 35A and 35A to be conductive by the lock unit 31A sliding in the left side. By such movement, the control circuit 47 determines that the lock unit 31A is in the locked condition. Further, when the first fuel container 1A is attached to the attachment part 21A at this time, the protrusion 311A in the left side of the lock unit 31A engages with the engaging hole 32A of the first fuel container 1A and the first fuel container 1A is locked so as not to disengage from the power generation module 2.

From the condition shown in FIG. 3, the protrusion 311A in the left side is pulled out from the sliding hole 32A and the protrusion 312A in the right side abuts the inner wall surface in the right side which forms the sliding hole 33A and the movement of the lock unit 31A is stopped by the lock unit 31A slide in the right side as shown in FIG. 4. At the same time, the contact portions 341A and 341A of the connecting unit 34A are separated from the electrodes 35A and 35A and contacts with the lock recognizing unit 36A, and the electrical connection is released. By such movement, the control circuit 47 determines that the lock of the lock unit 31A is released. Further, when the first fuel container 1A is attached to the attachment part 21A at this time, the protrusion 311A in the left side of the lock unit 31A is pulled out from the engaging hole 32A of the first fuel container 1A and the lock is released, and the first fuel container 1A can be detached from the power generation module 2.

Next, the inner structure of the power generation module 2 will be described.

Figure 5:
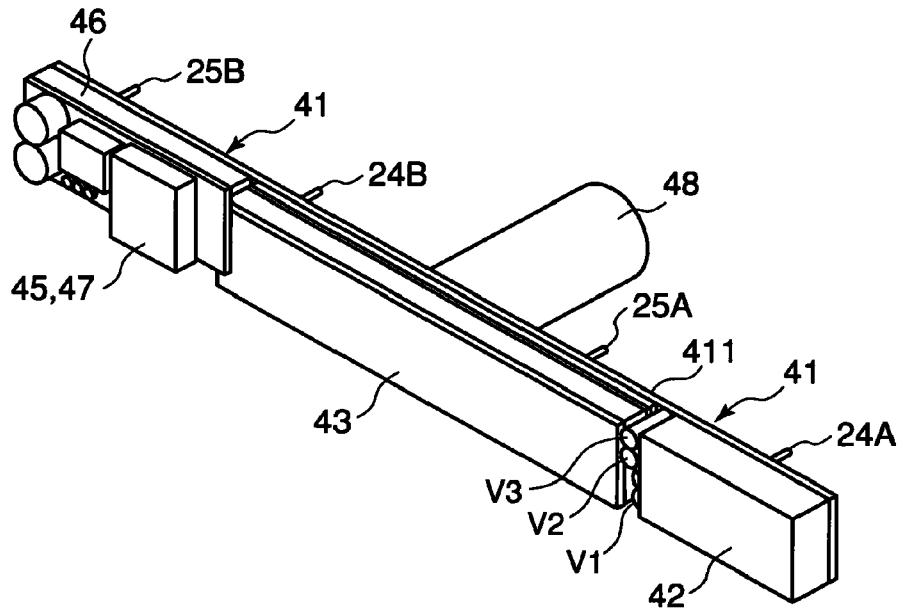
FIG. 5 is a perspective view of an inner mechanism of the power generation module 2.
Figure 6:
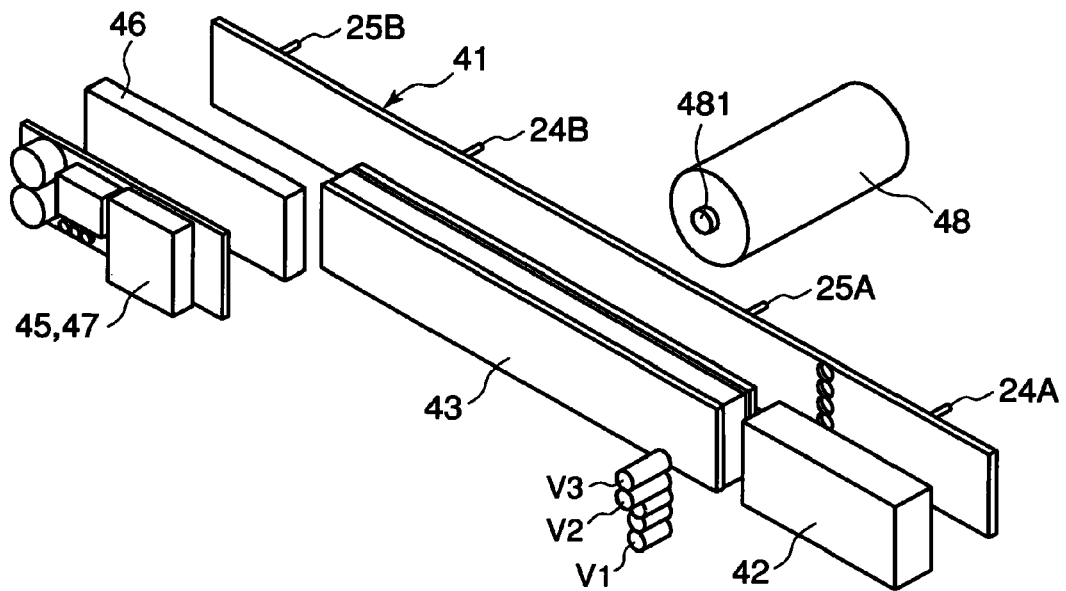
FIG. 6 is an exploded perspective view of FIG. 5.

FIG. 5 is a perspective view of the inner structure of the power generation module 2, and FIG. 6 is an exploded perspective view of FIG. 5.

In the longitudinal portion 22 of the power generation module 2, a flow path control unit 41, a micro reforming unit 42, a power generation cell 43, an air filter 44 (see FIG. 7), a DC/DC converter 45, a secondary battery 46, the control circuit 47 (see FIG. 7) and the like are housed. In the shorter unit 23, an air pump 48 is housed. For example, the flow path control unit 41 is constituted of a multi layered substrate 411 in which a plurality of substrates are stacked.

Figure 7:
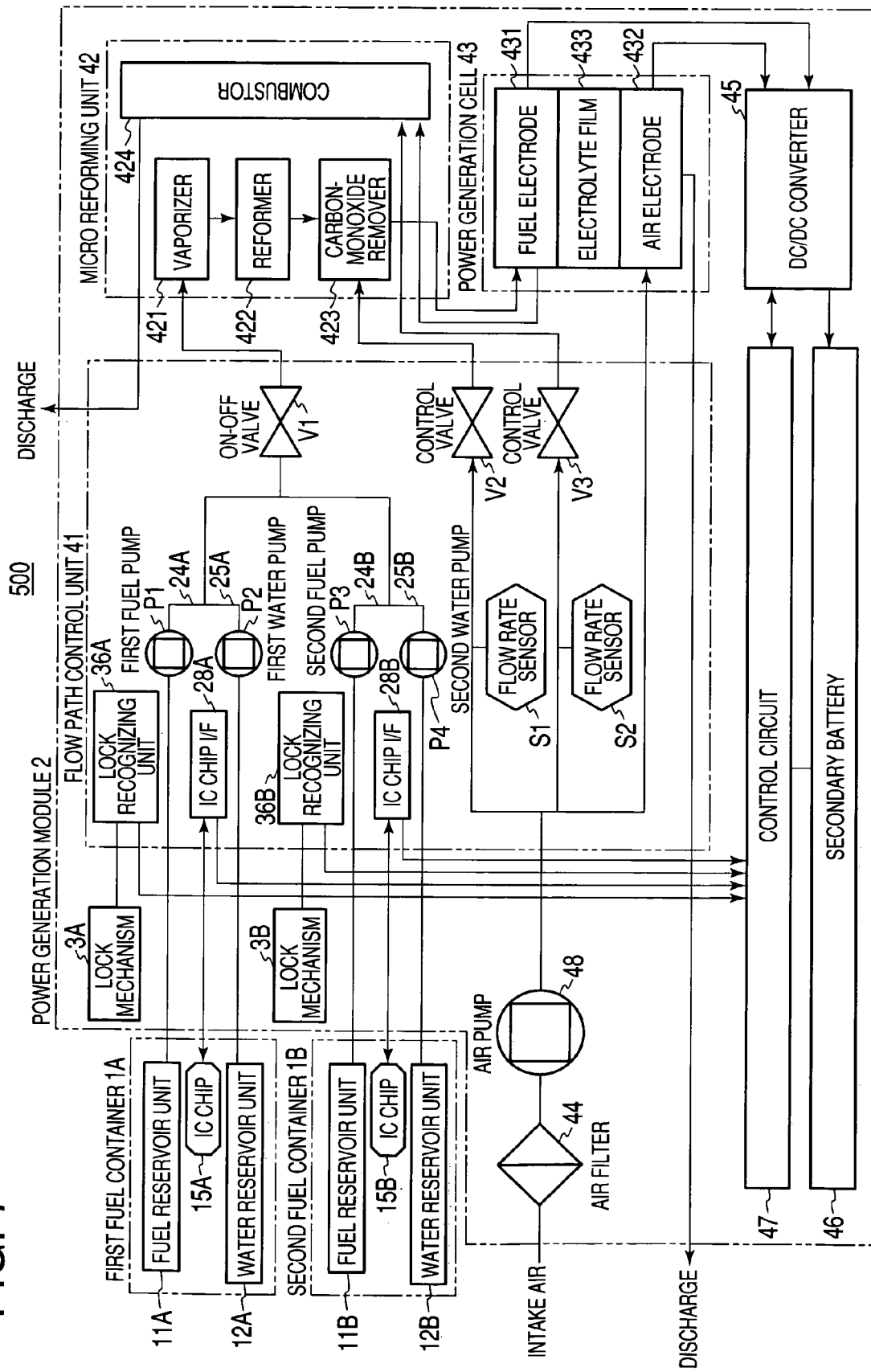
FIG. 7 is a block diagram showing a basic structure of a power generation system 500.

The flow path control unit 41 is formed with the multi layered substrate 411, and comprises the first fuel pump P1 to supply the fuel 18 from the first fuel container 1A, the first water pump P2 to supply the water 19, the second fuel pump P3 to supply the fuel 18 from the second fuel container 1B, the second water pump P4 to supply the water 19, a micro valve V1 which is connected to the first fuel pump P1, the first water pump P2, the second fuel pump P3 and the second water pump P4 and micro valves V2 and V3 which are connected to the after mentioned air pump 48 as shown in the after mentioned FIG. 7. Here, the first fuel pump P1, the first water pump P2, the second fuel pump P3 and the second water pump P4 are not shown in FIGS. 5 and 6 because they are disposed inside of the multi layered substrate 411.

The micro valves V1 to V3 are mounted on the upper surface of the multi layered substrate 411. The micro valve V1 is an on-off valve by which the fluid is allowed to flow or blocked by opening and closing the valve, and the micro valves V2 and V3 are the control valves (variable valves) to control the flowing amount of the fluid.

The micro reforming unit 42 is surface mounted on the upper surface of the multi layered substrate 411. The vaporizer 421, the reformer 422, the carbon-monoxide remover 423 and the combustor 424 which are shown in the after mentioned FIG. 7 are unitized to constitute the micro reforming unit 42. The vaporizer 421 communicates with the reformer 422, and the reformer 422 communicates with the carbon-monoxide remover 423. The micro reforming unit 42 is housed inside of the heat insulated package.

On the lower surface of the micro reforming unit 42, each ports (omitted from the drawing) for each flow paths of the flow path control unit 41 to communicate with the vaporizer 421, the reformer 422, the carbon-monoxide remover 423 and the combustor 424 are provided.

On the upper surface of the multi layered substrate 411, the power generation cell 43 is surface mounted along with the micro reforming unit 42. The power generation cell 43 is a fuel cell in which a fuel electrode 431 which carries the catalyst, an oxygen electrode 432 which carries the catalyst and an electrolyte film 433 which is held between the fuel electrode 431 and the oxygen electrode 432 which are shown in the after mentioned FIG. 7 are unitized. On the lower surface of the power generation cell 43, each port (omitted from the drawing) which communicate with the fuel electrode 431 and the oxygen electrode 4432 are provided. Further, on the upper surface of the multi layered substrate 411, the secondary battery 46, the control circuit 47 and the DC/DC converter 45 are surface mounted.

The air pump 48 is surface mounted at the center position on the lower surface of the multi layered substrate 411 via the air filter 44 (see FIG. 7), and is housed inside of the shorter unit 23. A port 481 from which the aspirated air is exhausted to the air pump 48 is formed at the air pump 48, and the air aspirated through the air filter 44 is to be supplied to each unit through the flow path in the multi layered substrate 411 via the port 481.

Next, the power generation system 500 which comprises the power generation module 2 and the first and the second fuel containers 1A and 1B will be described. FIG. 7 is a block diagram showing the basic structure of the power generation system 500.

The power generation system 500 comprises the first and the second fuel containers 1A and 1B and the power generation module 2 which generates electricity by the fuel 18 and the water 19 being supplied from the first and the second fuel containers 1A and 1B.

As described above, the power generation module 2 comprises the flow path control unit 41, the micro reforming unit 42 including the vaporizer 421, the reformer 422, the carbon-monoxide remover 423 and the combustor 424, the power generation cell 43, the secondary battery 46, the control circuit 47, the DC/DC converter 45, the air pump 48, the air filter 44 and the like.

The flow path control unit 41 comprises the first fuel pump P1 and the first water pump P2 which are connected to the first fuel container 1A, the second fuel pump P3 and the second water pump P4 which are connected to the second fuel container 1B and the micro valves V1 to V3.

The first fuel pump P1 is connected to the fuel supply unit 24A which is provided at the attachment part 21A of the power generation module 2, the first water pump P2 is connected to the water supply unit 25A, the second fuel pump P2 is connected to the fuel supply unit 24B which is provided at the attachment part 21B of the second fuel pump P2, and the second water pump P4 is connected to the water supply unit 25B.

The micro valve V1 is provided between the first and the second fuel pumps P1 and P3 and the first and the second water pumps P2 and P4 and the vaporizer 421. The micro valve V1 blocks the fuel 18 and the water 19 from flowing into the vaporizer 421 from the first and the second fuel pump P1, P3 and the first and the second water pump P2, P4 or allows this flow of the fuel 18 and the water 19 by its opening and closing operation.

The vaporizer 421 generates the fuel gas (a mixture of vaporized fuel and moisture) by vaporizing the fuel 18 and the water 19 which are supplied from the first fuel container 1A and the second fuel container 1B, and the reformer 422 generates the reformed gas including hydrogen by reforming the fuel gas which is supplied from the vaporizer 421 as shown in the chemical reaction formula (1). Further, the carbon-monoxide remover 423 removes the carbon-monoxide which is generated in small amount by the chemical reaction formula (2) which occurs sequentially following the chemical reaction formula (1) by oxidizing the carbon-monoxide as shown in the chemical reaction formula (3). The combustor 424 is a device which combusts the remained hydrogen among the hydrogen supplied to the power generation cell 43 without occurrence of the after mentioned electrochemical reaction. Further, the combustor 424 sets each of the vaporizer 421, the reformer 422 and the carbon-monoxide remover 423 so as to be heated to the suitable temperature so that they reach the temperature needed for the vaporizer 421 to vaporize the fuel 18 and the water 19, for the reformer 422 to carry out the reaction of chemical reaction formula (1) in a good condition, and for the carbon-monoxide remover 423 to carry out the reaction of chemical reaction formula (3) in a good condition.

$$CH_3OH + H_2O \rightarrow 3H_2 + CO_2 \qquad (1)$$

$$H_2 + CO_2 \rightarrow H_2O + CO \qquad (2)$$

$$2CO + O_2 \rightarrow 2CO_2 \qquad (3)$$

Hydrogen which is supplied from the carbon-monoxide remover 423 is supplied to the oxygen electrode 432 of the power generation cell 43, and air is supplied to the fuel electrode 431 from outside by the air pump 48. At the oxygen electrode 432, hydrogen in the gas mixture is separated into hydrogen ion and electron by being effected by the action of catalyst particle of the oxygen electrode 432 as shown in the electrochemical reaction formula (4). The hydrogen ion is conductive to the fuel electrode 431 through the electrolyte film 433, and the electron is taken out as the electrical energy (generated electricity) by the oxygen electrode 432. At the fuel electrode 431, water is generated by the electron which moved to the fuel electrode 831, oxygen in the air and the hydrogen ion which passed through the electrolyte film 433 reacting with one another as shown in the electrochemical reaction formula (5). Then, the off gas including the hydrogen which did not react at the oxygen electrode 432 is sent to the combustor 424, and the water generated at the fuel electrode 431 and the non-reacted air are exhausted as discharge.

$$H_2 \rightarrow 2H^+ + 2e^- \qquad (4)$$

$$2H^+ + 1/2 O_2 + 2e^- \rightarrow H_2O \qquad (5)$$

The micro valves V3 and V3 are respectively connected to the air pump 48 via each of the flow rate sensors S1 and S2. The micro valve V2 is provided between the air pump 48 and the carbon-monoxide remover 423, and blocks or adjusts the flowing of the air into the carbon-monoxide remover 423 from the air pump 48 by its opening/closing operation. Further, the micro valve V3 is provided between the air pump 48 and the combustor 424, and blocks or adjusts the flowing of the air into the combustor 424 from the air pump 48 by its opening/closing operation.

The control circuit 47 is constituted of the standard type CPU (Central Processing Unit), the RAM (Random Access Memory), the ROM (Read Only Memory) and the like, for example. The first and the second fuel pumps P1 and P3, the first and the second water pumps P2 and P4 and the air pump 48 are electrically connected to the control circuit 47 via a driver (omitted from the drawing). The control circuit 47 controls the pumping operation (including the adjustment of delivery rate) of each of the first and the second fuel pumps P1 and P3, the first and the second water pumps P2 and P4 and the air pump 48.

Moreover, the lock recognizing units 36A and 36B of the lock mechanisms 3A and 3B and the IC chip I/F 28A and 28B are electrically connected to the control circuit 47. The control circuit 47 detects the lock or the lock release by the lock mechanisms 3A and 3B by the presence or absence of the electrical connection. Particularly, when the contact portions 341A and 341A of the connecting unit 34A of the lock mechanisms 3A and 3B are respectively connected to the electrodes 35A and 35A, the control circuit 47 detects that the lock units 31A and 31B are in the locked condition, and when the contact portions 341A and 341A of the connecting unit 34A are separated from the electrodes 35A and 35A, the control circuit 47 detects that the lock of the lock units 31A and 31B are released.

Moreover, the control circuit 47 detects whether the first or the second fuel container 1A or 1B is attached to the attachment part 21A or 21B by the IC chip I/F 28A or 28B detecting the IC chip 15A or 15B.

Furthermore, when the control circuit 47 detects that the first or the second fuel container is locked by the lock mechanism 3A or 3B, and when the control circuit 47 detects that the first and the second fuel container 1A or 1B is attached by the IC chip I/F 28A or 28B detecting the IC chip 15A or 15B, the control circuit 47 controls so as to read the remaining amount data of the fuel 18 and the water 19 and the like which are stored in the IC chip 15A or 15B in the IC chip I/F 28A or 28B. Then, when each remaining amount is less than a predetermined amount needed for the power generation, the control circuit 47 does not activate the power generation system 500 or stops the operation of the power generation system 500. When the remaining amount is more or equal to the predetermined amount needed for the power generation, the control circuit 47 activates the power generation system 500 or controls so as to maintain the operation of the power generation system 500. On the other hand, when the control circuit 47 detects that the lock of the first or the second fuel container is released by the lock mechanism 3A or 3B, and when the control circuit 47 detects that the first or the second fuel container 1A or 1B is attached by the IC chip I/F 28A or 28B detecting the IC chip 15A or 15B, the control circuit 47 calculates the remaining amount of the fuel 18 and the water 19 in the fuel container 1A or 1B from the sent amount of the fuel 18 and the water 19, and controls so as to write the remaining amount of the fuel 18 and the water 19 in the IC chip 15A or 15B by the IC chip I/F 28A or 28B according to the detection by the lock mechanism 3A or 3B before the first or the second fuel container 1A or 1B which is in the middle of solution sending is detached.

Moreover, the micro valves V1 to V3 are electrically connected to the control circuit 47 via a driver (omitted from the drawing), and the flow rate sensors S1 and S2 are also electrically connected to the control circuit 47. The control circuit 47 detects the locked condition by the lock mechanism 3A or 3B which is described above, and when it is confirmed that at least one of the first fuel container 1A and the second fuel container 1B is attached and that the remaining amount of the attached fuel container is pertinent, the control circuit 47 selects either one of the combination of the first fuel pump P1 and the first water pump P2 and the combination of the second fuel pump P3 and the second water pump P4 according to the after mentioned step S14 or step S17, and starts to supply the fuel and the like to the micro reforming unit 42. Further, the control circuit 47 can recognize the flow rate of air by receiving the measurement result of the flow rate sensors S1 and S2 by driving the micro valves V1 to V3 along with the above movement of the pumps, and the control circuit 47 controls the opening/closing movement (including the adjustment of opening rate) of the micro valves V1 to V3.

Here, the control circuit 47 calculates each remaining amount of the fuel 18 and the water 19 of the first fuel container 1A and each remaining amount of the fuel 18 and the water 19 of the second fuel container 1B from the sent amount of the solutions, and used the fuel 18 and the water 91 in the first fuel container 1A side first by operating the micro valve V1, the first fuel pump P1 and the first water pump P2 when the remaining amount in the first fuel container 1A side is less than the remaining amount in the second fuel container 1B side. On the other hand, the control circuit 47 controls so as to use the fuel 18 and the water 19 in the second fuel container 1B side by operating the micro valve V1, the second fuel pump P3 and the second water pump P4 when the remaining amount in the second fuel container 1B side is less than the remaining amount in the first fuel container 1A side.

Moreover, an electrical heater which heats the vaporizer 421, the reformer 422 and the carbon-monoxide remover 423 is electrically connected to the control circuit 47 via a driver when the power generation cell 43 and the reformer 42 are stated-up and until the combustion heat of the combustor 424 is normalized. The control circuit 47 controls the heat release value of the electrical heater and its stoppage, and also the control circuit 47 can detect the temperature of each reactor of the vaporizer 421, the reformer 422 and the carbon-monoxide remover 423 by measuring the resistance value of the electrical heater which changes depending on the temperature. The electrical heater may stop or reduce its heat value when the combustor 424 starts combustion and when the heating is stabilized.

The DC/DC converter 45 is connected to the power generation cell 43, and an outside power source (omitted from the drawing), that is, an outside device (load) which can operate by receiving the electricity supply from the power generation system 500 is connected to the DC/DC converter 45. The DC/DC converter 45 is a device which converts the voltage which is output from the power generation cell 43 into a predetermined voltage according to the standard of the outside electronic device and outputs the converted voltage to the outside electronic device. The DC/DC converter 45 is connected to the control circuit 47, and the control circuit 47 can detect the input electricity which is input to the DC/DC converter 45 from the power generation cell 43.

Moreover, the secondary battery 46 is connected to the DC/DC converter 45, and the electrical energy obtained at the power generation cell 43 is stored in the secondary battery 46 and the electricity can be supplied from the secondary battery 46 to the outside electronic device as an alternative to the power generation cell 43 when the generation of electrical energy in the power generation cell 43 is stopped. At the time of start-up, the control circuit 47, each drivers, each sensors S1 and S2 and the electrical heater of the micro reforming unit 42 are electrically driven by a part of output of the secondary battery 46 via the DC/DC converter 45, and they are electrically driven by a part of the output of the power generation cell 43 via the DC/DC converter 45 when the output of the power generation cell 43 is normalized.

For example, the power generation system 500 having the above structure is equipped in the desk-top type personal computer, the notebook type personal computer, the cell phone, the PDA (Personal Digital Assistant), the electrical planner, the watch, the digital still camera, the digital video camera, the game device, the game machine, the electronic device for household and other electronic devices (outside electronic devices), and is used as the power source to operate the outside electronic devices.

Figure 8:
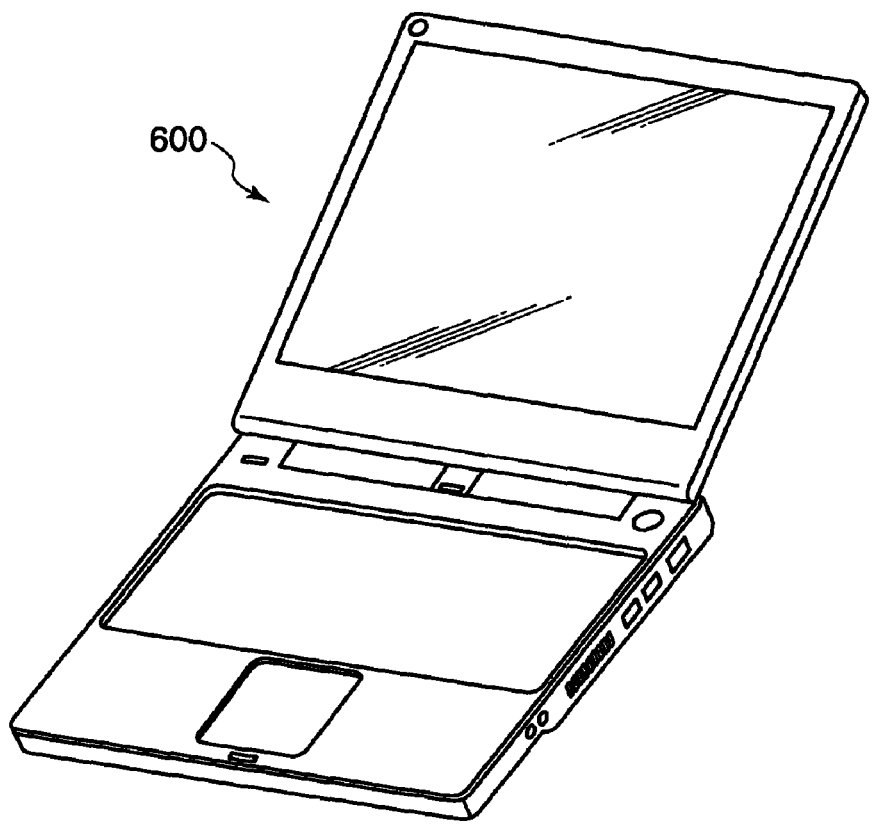
FIG. 8 is a perspective view when a notebook type personal computer 600 is seen from the front.
Figure 9:
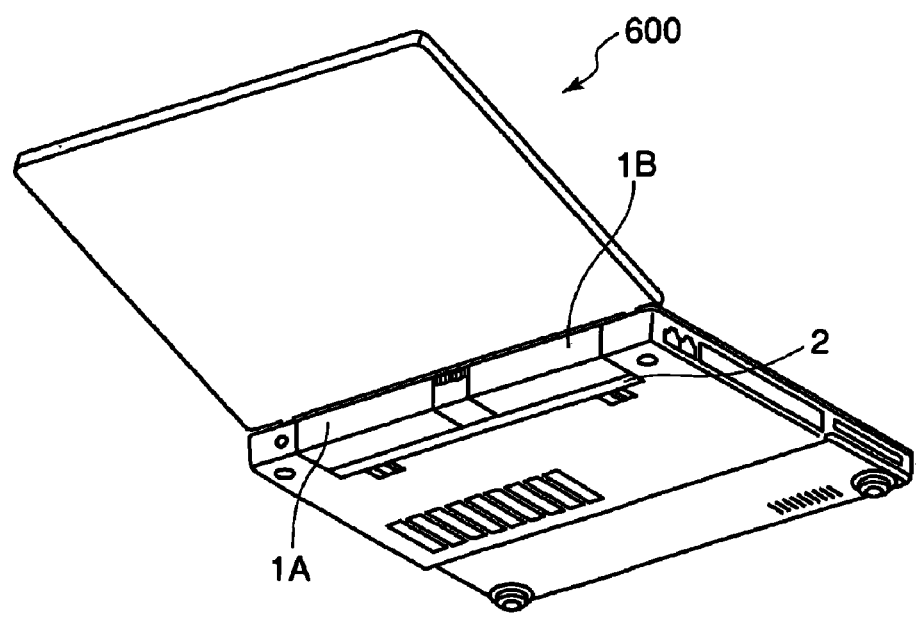
FIG. 9 is a perspective view when the notebook type personal computer 600 is seen from the back.

Here, a case where the present invention is applied for the notebook type personal computer 600 is shown in FIGS. 8 and 9. FIG. 8 is a perspective view of a case where the notebook type personal computer 600 is seen from the front, and FIG. 9 is a perspective view of a case where the notebook type personal computer 600 is seen from the back.

In FIGS. 8 and 9, the power generation module 2 is installed in the back surface of the notebook type personal computer 600, and the first and the second fuel containers 1A and 1B are attachable to the power generation module 2.

Next, the operation of the power generation system 500 will be described.

The power generation system 500 operates by the operation signal being input to the control circuit 47 from the outside electronic device via the communication terminal and the communication electrode. This allows the control circuit 47 to operate the first and the second fuel pumps P1 and P3, the first and the second water pumps P2 and P4 and the air pump 48, and also to allow the electrical heater to generate heat. While the power generation system 500 is operating, the control circuit 47 controls the temperature so that each electrical heater be at the predetermined temperature according to the temperature data which is fed back from each electrical heaters.

Figure 10A:
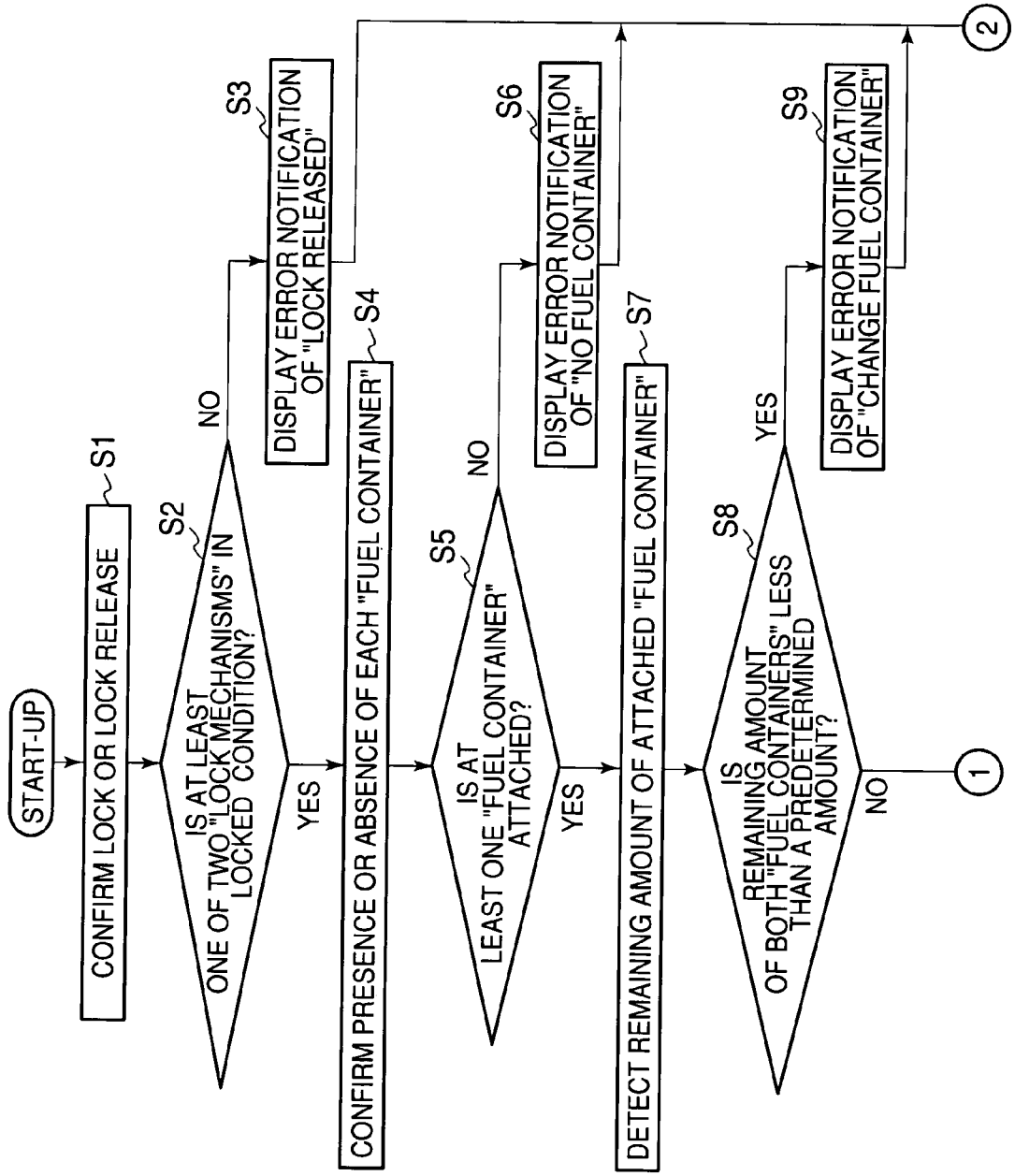
FIGS. 10A and 10B are a flowchart showing an operation of the first and the second fuel pumps P1 and P3 and the first and the second water pumps P2 and P4 and a switching operation process of a micro valve V1 at the time of start-up.
Figure 10B:
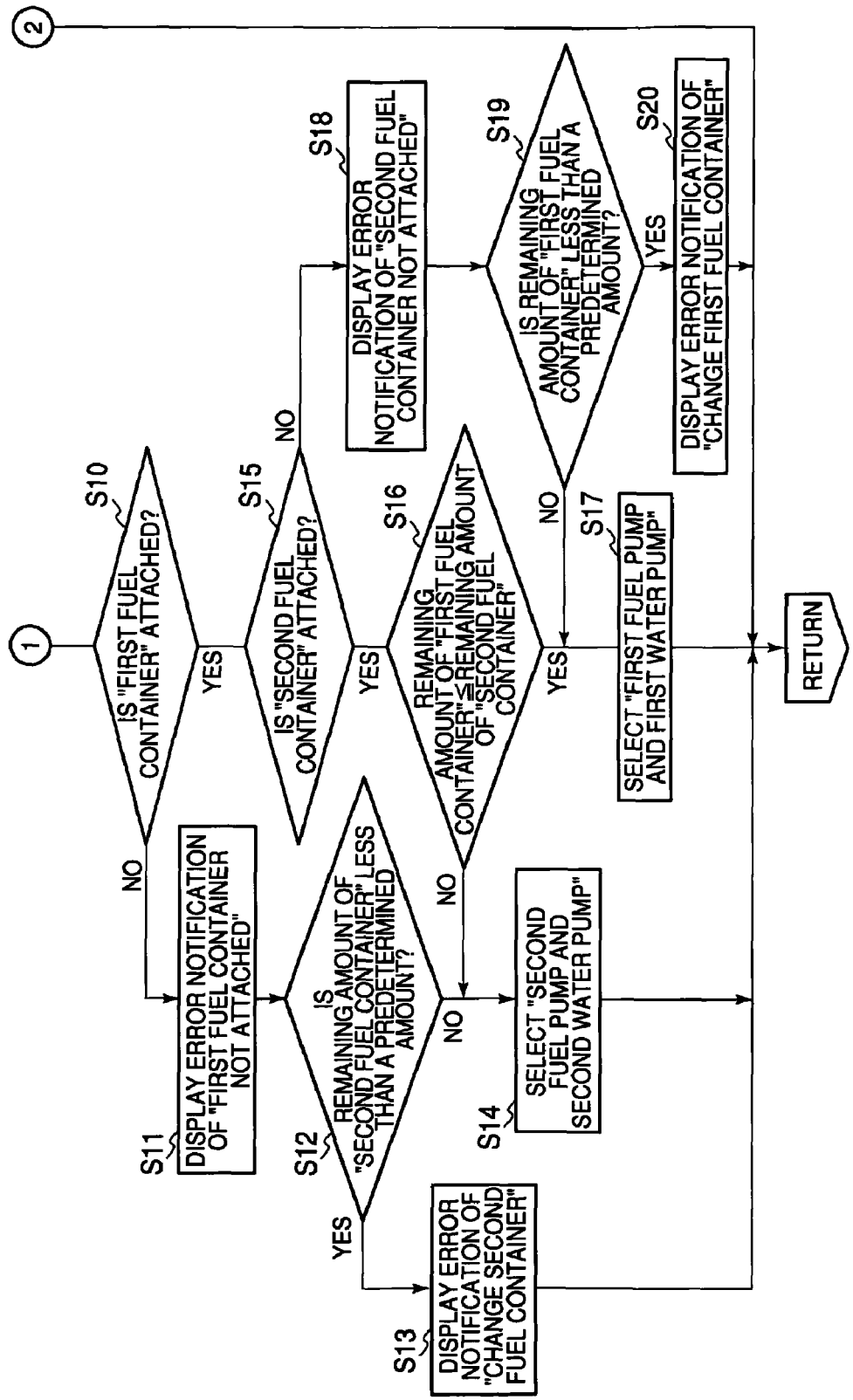

Moreover, the control circuit 47 carries out the activation of the first and the second fuel pumps P1 and P3 and the first and the second water pumps P2 and P4 and carries out the switching operation of the micro valve V1 as described below. FIGS. 10A and 10B are a flowchart showing the activation of the first and the second fuel pumps P1 and P3 and the first and the second water pumps P2 and P4 and the switching operation process of the micro valve V1 at the time of start-up.

First, the control circuit 47 carries out the confirmation of the lock or the lock release by the lock mechanisms 3A and 3B (step S1), and determines whether at least one of the lock mechanisms 3A and 3B in the right and left is locked or not (step S2). Particularly, the control circuit 47 determines whether the electrodes 35A and 35A are made to be conductive or not and whether the electrodes 35B and 35B are made to be conductive or not by at least one of the lock unit 31A and 31B of the right and left lock mechanism 3A and 3B. The control circuit 47 determines that either of the lock mechanisms 3A and 3B is not locked when either of the electrodes is not conductive, and carries out the error notification of "lock released" (step S3). When at least one of the lock units 31A and 31B of the right and left lock mechanisms 3A and 3B is conductive, the control circuit 47 determines that at least one of the lock units is locked, and the control circuit 47 carries out the confirmation of presence or absence of the fuel containers 1A and 1B by the IC chip I/F 28A or 28B which is in the locked side (step S4). The confirmation of the presence or absence of the fuel containers 1A and 1B is carried out by the IC chip I/F 28A or 28B determining whether at least one of the fuel containers 1A and 1B is attached to the attachment part 21A or 21B or not by detecting the IC chip 15A or 15B (step S5). When either of the fuel containers 1A and 1B are not attached to the attachment parts 21A and 21B, the control circuit 47 carries out the error notification of "no fuel container" (step S6). When it is confirmed that at least one of the fuel containers 1A and 1B is attached by the IC chip I/F 28A or 28B, the control circuit 47 detects the remaining amount of the fuel 18 and the water 19 of the attached fuel container 1A or 1B (step S7). When the other of the first and the second fuel containers 1A and 1B is not attached after the above step, the control circuit 47 assumes that the remaining amount of the fuel 18 and the water 19 is less than the amount (a predetermined amount) by which the power generation cell 43 can generate electricity.

Then, the control circuit 47 determines whether the remaining amount of the fuel 18 and the water 19 of both the first and the second fuel contains 1A and 1B are less than the predetermined amount which is the amount just needed for the power generation or not (step S8). When the remaining amount of the fuel 18 and the water 19 of both the first and the second fuel containers 1A and 1B are less than the predetermined amount, the control circuit 47 carries out the error notification of "change fuel container" (step S9). When the remaining amount of the fuel 18 and the water 19 of at least one of the first and the second fuel containers 1A and 1B is more or equal to the predetermined amount which is the amount just needed for the power generation, the control circuit 47 first detects whether the first fuel container 1A is attached or not by the IC chip I/F 28A (step S10).

When the first fuel container 1A is not attached, the control circuit 47 carries out the error notification of "first fuel container not attached" (step S11). Then, the control circuit 47 determines whether the remaining amount of the fuel 18 and the water 19 of the second fuel container 1B is less than the predetermined amount which is the amount just needed for power generation or not (step S12), and carries out the error notification of "change second fuel container" (step S13) when the remaining amount is less than the predetermined amount. When the remaining amount of the fuel 18 and the water 19 of the second fuel container 1B is more or equal to the predetermined amount, the control circuit 47 selects the second fuel pump P3 and the second water pump P4 and connects the micro valve V1 to the second fuel container 1B (step S14).

When it is detected that the first fuel container 1A is attached in step S10, the control circuit 47 determines whether the second fuel container 1B is attached or not (step S15). When it is determined that the second fuel container 1B is attached, the control circuit 47 determines whether the remaining amount of the fuel 18 and the water 19 of the second fuel container 1B is more or equal to the remaining amount of the fuel 18 and the water 19 of the first fuel container 1A or not (step S16). When it is determined that the remaining amount of the second fuel container 1B is less than the remaining amount of the first fuel container, the control circuit 47 selects the second fuel pump P3 and the second water pump P4 and connects the micro valve V1 to the second fuel container 1B (step S14). When it is determined that the remaining amount of the second fuel container 1B is more or equal to the remaining amount of the first fuel container 1A, the control circuit 47 selects the first fuel pump P1 and the first water pump P2 and connects the micro valve V1 to the first fuel container 1A (step S17).

When it is determined that the second fuel container 1B is not attached in step S15, the control circuit 47 carries out the error notification of "second fuel container not attached" (step S18). Then, the control circuit 47 determines whether the remaining amount of the fuel 18 and the fuel 19 of the first fuel container 1A is less than the predetermined amount which is the amount just needed for power generation or not (step S19), and the control circuit 47 selects the first fuel pump P1 and the first water pump P2 and connects the micro valve V1 to the first fuel container 1A when the remaining amount is more or equal to the predetermined amount (step S17). When the remaining amount of the fuel 18 and the water 19 of the first fuel container 1A is less than the predetermined amount, the control circuit 47 carries out the error notification of "change fuel container" (step S20).

As described above, the control circuit 47 executes the flow of FIGS. 10A and 10B periodically, and detects the lock or the lock release of the lock mechanisms 3A and 3B, monitors the attachment or non-attachment of the first and the second fuel containers 1A and 1B and switches the micro valve V1 to the fuel container 1A or 1B which is to be used by operating the first fuel pump P1 and the first water pump P2 or the second fuel pump P3 and the second water pump P4 according to the remaining amount of each fuel containers 1A and 1B. When the control circuit 47 repeats the above flow until the fuel 18 and the water 19 of one of the fuel containers (for example, the first fuel container) is used up or until one of the fuel containers (for example, the first fuel container 1A) is detached, the control circuit 47 uses the fuel 18 and the water 19 of the other fuel container (for example, the second fuel container). Similarly, the control circuit 47 repeats the above flow until the fuel 18 and the water 19 of the other fuel container (for example, the second fuel container 1B) are used up or until the other fuel container (for example, the second fuel container 1B) is detached. Then, when the fuel 18 and the water 19 of both fuel containers 1A and 1B are used up or when the containers are detached, the control circuit 47 carries out the error notification which indicates to change the fuel container, and the power generation system 500 is stopped. When it is changed to the new fuel container, the power generation system 500 is activated and the above flow is executed, and the continuous operation can be carried out.

Subsequently, the operation which is carried out after the switching operation of the first or the second fuel container 1A or 1B by the micro valve V1 is carried out will be described.

For convenience of explanation, the operation will be described by referring to a case where both the first fuel container 1A and the second fuel container 1B are respectively attached to the attachment parts 21A and 21B, where the remaining amount of the first fuel container 1A is less or equal to the remaining amount of the second fuel container 1B and is the amount just needed for power generation and where the first fuel pump P1 and the first water pump P2 are activated as an example in the following description.

When the first fuel pump P1 and the first water pump P2 which are selected by the above described flow are activated, the fuel 18 in the fuel reservoir unit 11A of the first fuel container 1A is sent to the vaporizer 421 of the micro reforming unit 42 from the fuel supply unit 24A via the micro valve V1, and the water 19 in the water reservoir unit 12A is sent to the vaporizer 421 of the micro reforming unit 42 from the water supply unit 25A via the micro valve V1.

When the air pump 48 is activated, outside air is sent to the combustor 424 via the micro valve V3 and is sent to the carbon-monoxide remover 423 via the micro valve V2. Further, outside air is sent to the air electrode 432 of the power generation cell 43 by the activation of the air pump 48. Here, the control circuit 47 controls each micro valves V2 and V3 so that the air flow be the predetermined flow rate based on the flow rate data which is fed back from each flow rate sensors S1 and S2.

In the vaporizer 421, the supplied fuel 18 and water 19 are heated and vaporized (evaporation), and are supplied to the reformer 422 by becoming a gas mixture of methanol and water (water vapor).

In the reformer 422, carbon-dioxide and hydrogen are generated by the methanol and the water vapor in the gas mixture which is supplied from the vaporizer 421 reacting by the catalyst (see the above chemical reaction formula (1)). Further, carbon-monoxide is sequentially generated following the chemical reaction formula (1) in the reformer 422 (see the above chemical reaction formula (2)). Then, the gas mixture of carbon-monoxide, carbon-dioxide, hydrogen and the like which is generated in the reformer 422 is supplied to the carbon-monoxide remover 423.

In the carbon-monoxide remover 423, carbon-dioxide and hydrogen are generated from carbon-monoxide and water vapor in the gas mixture which is supplied from the reformer 422, and also carbon-dioxide is generated by carbon-monoxide which is specifically selected from the gas mixture reacting with oxygen which is included in air supplied from the micro valve V2 (see the above chemical reaction formula (3)).

As described above, carbon-dioxide and hydrogen are generated from the fuel 18 which came through the vaporizer 421, the reformer 422 and the carbon-monoxide remover 423 of the micro reforming unit 42. The reformed gas (carbon-dioxide, hydrogen and the like) which is generated in the micro reforming unit 42 is supplied to the fuel electrode 431 of the power generation cell 43 after being humidified by the humidifier. Then, hydrogen in the reformed gas is separated into hydrogen ion and electron as shown in the above chemical reaction formula (4).

On the other hand, the air which is supplied via the air pump 48 is supplied to the air electrode 432 of the power generation cell 43. Oxygen in the air which is supplied to the air electrode 432 of the power generation cell 43 reacts with the hydrogen ion and electrode as shown in the above chemical reaction formula (5), and water is generated as a byproduct.

Here, the hydrogen which is unreacted in the fuel 431 side is sent to the combustor 424 as the off gas and is burnt, and is used as energy to arbitrary heat the micro reformation unit 42. The exhaust gas which is obtained by the off gas being combusted in the combustor 424 is exhausted outside. In the air electrode 432 side, the supplied air is exhausted along with water which is a byproduct.

The electrical energy which is generated by the power generation cell 43 is charged to the secondary battery 46. Further, the generated electrical energy is supplied to the DC/DC converter 45, is converted into a predetermined voltage of direct current by the DC/DC converter 45, and is supplied to the outside electronic device. The outside electronic device operates by the supplied electrical energy.

The operation is the same as the above described operation for the case where the remaining amount of the first fuel container 1A is more than the remaining amount of the second fuel container 1B and when the second fuel pump P3 is activated except that the fuel 18 is supplied from the second fuel container 1B. Therefore, the description is omitted.

Figure 11:
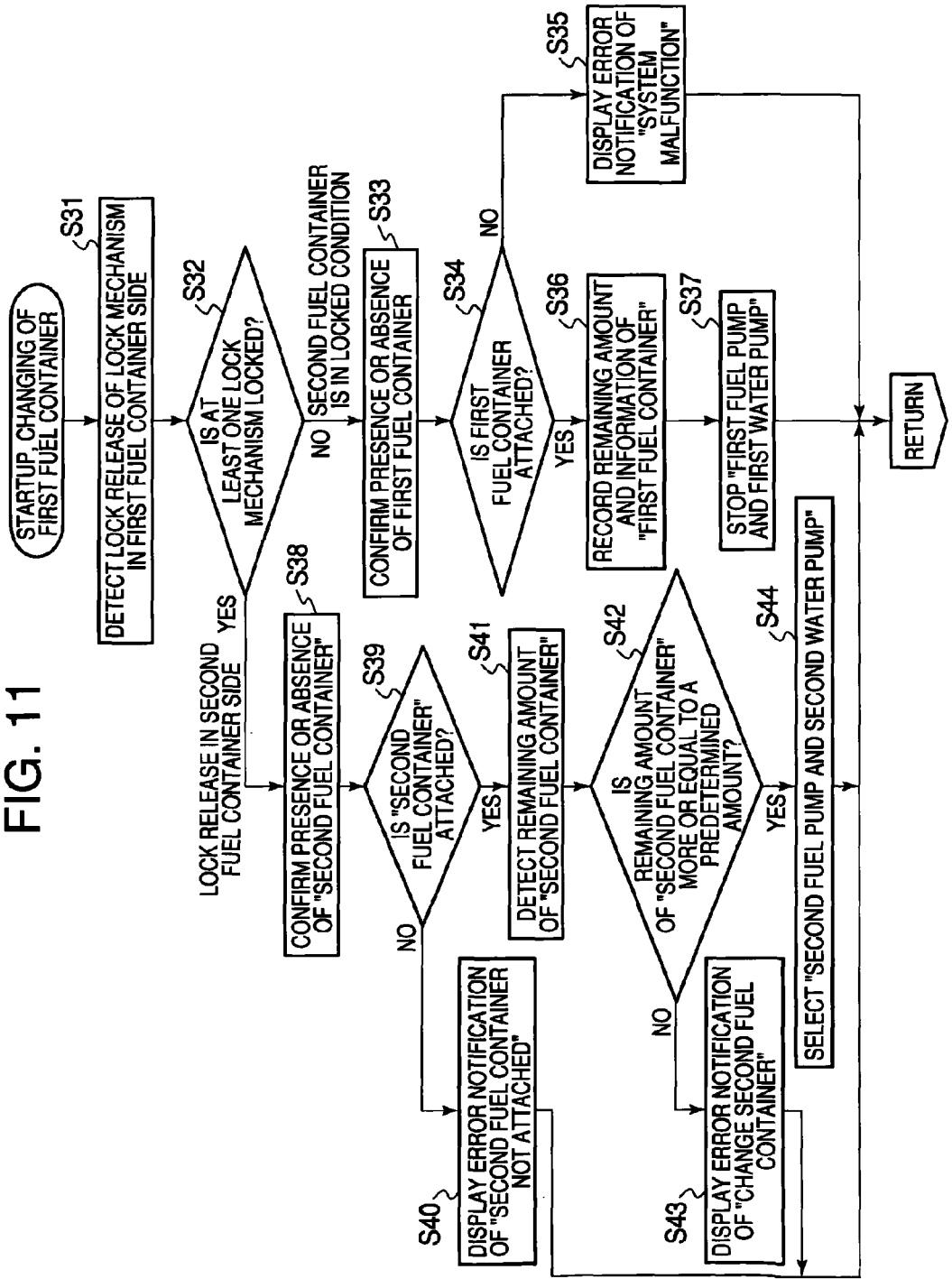
FIG. 11 is a flowchart showing an operation of the first and the second fuel pumps P1 and P3 and the first and the second water pumps P2 and P4 and a switching operation process of the micro valve V1 when changing the first fuel container 1A.

Subsequently, the operation carried out in a case where one of the fuel containers (1A or 1B) is detached when both the first and the second fuel containers 1A and 1B are respectively attached to the attachment parts 21A and 21B as described above and when the first fuel container 1A side is being used will be described. Here, for convenience of explanation, the description will be given by referring to a case where the first fuel container 1A is detached as an example. FIG. 11 is a flowchart showing the activation of the first and the second fuel pumps P1 and P3 and the first and the second water pumps P2 and P4 and the switching operation process of the micro valve V1 when the first fuel container 1A is being changed.

In a case where the first fuel container 1A is detached when the flow shown in the above FIGS. 10A and 10B is carried out, first, when the control circuit 47 detects that the contact portions 341A and 342A of the lock unit 31A in the first fuel container 1A side are separated from the electrodes 35A and 35A and that the lock is released (step S31), the control circuit 47 determines whether at least one lock mechanism (3A or 3B) of the right and left lock mechanisms 3A and 3B is locked to not (step S32). Here, because the lock by the lock mechanism 3A in the first fuel container 1A side is released, the control circuit 47 confirms the presence or absence of the first fuel container 1A by the IC chip I/F 28A (step S33) when the lock of the lock mechanism 3B in the second fuel container 1B side is released. The confirmation of the presence or absence of the first fuel container 1A is carried out by the IC chip I/F 28A detecting the IC chip 15A to determined whether the first fuel container 1A is attached to the attachment part 21A or not (step S34). When the first fuel container 1A is not attached to the attachment part 21A, the control circuit 47 carries out the error notification of "system malfunction" (step S35).

When the first fuel container 1A is attached to the attachment part 21A, the IC chip I/F 28A stores data of the remaining amount of the fuel 18 and the water 19, the number of times of attachment and the like of the first fuel container A in the IC chip 15A (step S36). After this, the activated first fuel pump P1 and the first water pump P2 are stopped (step S37).

When the lock mechanism 3B in the second fuel container 1B side is locked in step S32, the control circuit 47 confirms the presence or absence of the second fuel container 1B by the IC chip I/F 28B (step S38). The confirmation of presence or absence of the second fuel container 1B is carried out by the IC chip I/F 28B detecting the IC chip 15B to determine whether the second fuel container 1B is attached to the attached part 21B or not (step S39). When the second fuel container 1B is not attached to the attachment part 21B, the control circuit 47 carries out the error notification of "no fuel container" (step S40). When the second fuel container 1B is attached to the attachment part 21B, the control circuit 47 detects the remaining amount of the fuel 18 and the water 19 of the second fuel container 1B (step S41). The control circuit 47 determines whether the remaining amount of the fuel 18 and the water 19 of the second fuel container 1B is more or equal to the predetermined amount which is needed for the power generation or not (step S42), and carries out the error notification of "change fuel container" (step S43) when the remaining amount is less than the predetermined amount. When the remaining amount is more or equal to the predetermined amount, the control circuit 47 selects the second fuel pump P3 and the second water pump P4, and connects the micro valve V1 to the second fuel container 1B side (step S44).

In the above description, the case where the first fuel container 1A is detached is described. The same operation is also carried out for the case where the second fuel container 1B is detached. Therefore, the description is omitted.

As described above, when the control circuit 47 detects that the conduction by the lock mechanisms 3A and 3B are released at start-up and that the lock is released, the updated data of the remaining amount and the like can be stored in the IC chip 15A and 15B because data such as the remaining amount of the fuel 18 and the water 19 and the like are promptly written in the IC chip 15A and 15B by the IC chip I/F 28A and 28B before the fuel containers 1A and 1B are detached from the attachment part 21A and 21B. Therefore, when the detached fuel container 1A and 1B are reused, the updated data of the remaining amount and the like can be detected by reading the data promptly without newly measuring the data and the like of the remaining amount and the like of the fuel containers 1A and 1B. Further, because it can be electrically detected that the lock is released by the lock mechanisms 3A and 3B and the data can be written in the IC chip 15A and 15B at the time of the detection before the fuel containers 1A and 1B are detached, there is no need to always carry out the writing operation to the IC chip 15A and 15B and the reduction of electricity consumption can be attempted.

Moreover, because the solution sending is stopped before the fuel containers 1A and 1B which are sending the solution are detached, the solution leakage and the entering of the air bubble in the system can be prevented.

The present invention is not limited to the above described embodiment and can be arbitrarily changed within the scope of the invention.

For example, the lock mechanisms 3A and 3B in the above described embodiment respectively include the lock units 31A and 31B and carry out the slide electrode type detection. However, the detection may be carried out by the optic sensor or the tact switch.

Figure 12:
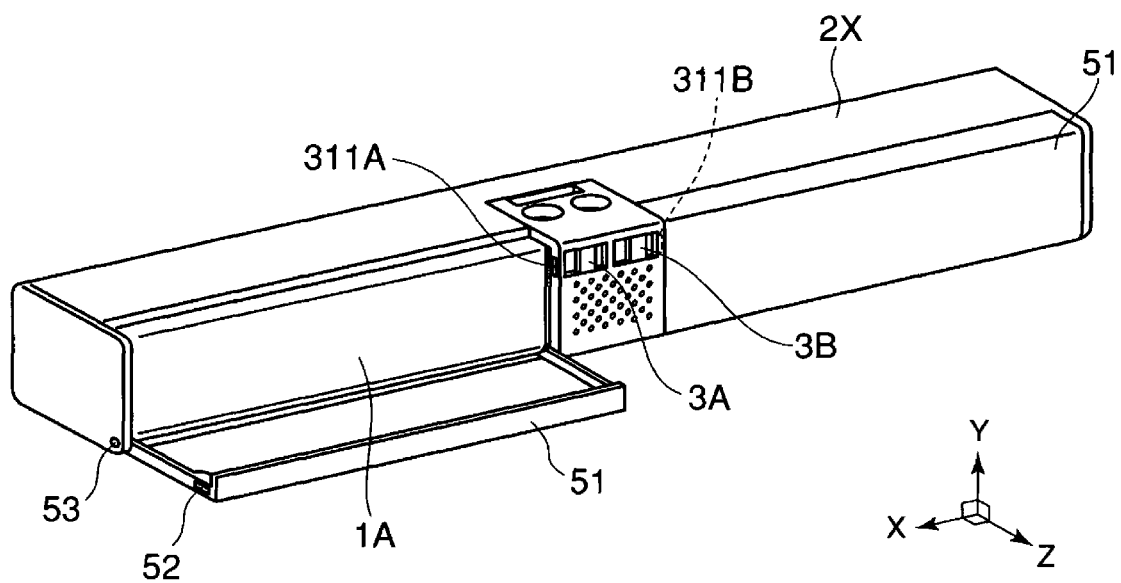
FIG. 12 is an outside perspective view showing a state where the two fuel containers 1A and 1B are attached to another power generation module 2X.

Moreover, as shown in FIG. 12, the present invention may be a power generation module 2X having a structure in which each open/close covers 51 and 51 which respectively cover the first fuel container 1A and the second fuel container 1B are fixed by being locked by the lock mechanisms 3A and 3B, respectively. The rotation axis 53 is respectively provided at the lower end in the right and left of the open/close cover 51, the rotation axis 53 are housed in the round holes which are provided on both sides of the attachment part 21A of the power generation module 2X, and the open/close cover 51 has a mechanism in which the open/close cover 51 is rotateable around the rotation axis 53 of the power generation module 2X. When the open/close cover 51 is closed, the protrusion 311A (or 311B) which is provided so as to correspond with the lock groove 52 engages with one of a pair of lock grooves 52 provided at both right and left ends of the open/close cover 51. Here, it is preferred that a small protrusion which corresponds to the other of the lock grooves 52 is provided at the power generation module 2X.

In such way, the fuel container 1A (or 1B) is completely cover with the power generation module 2X and is protected by being housed in the engaging hole 32A (ore 32B). Further, even when the color of the fuel container 1A (or 1B) is different from the color of the electronic device which operates by the power generation module 2X, the design can be improved as long as the color of the open/close cover 51 which houses the fuel container 1A (or 1B) accommodates the color of the electronic device.

On the other hand, when the open/close cover 51 is opened by releasing the lock by moving the lock unit 31A (or 31B), the fuel container 1A (or 1B) is exposed and the fuel container 1A (or 1B) can be changed.

Moreover, in the above described power generation system 500, a system which is provided with two fuel containers, the first fuel container 1A and the second fuel container 1B, is described as an example. However, the system may be provided with three or more fuel containers. Further, the system may be provided with only one fuel container.

Moreover, in the above described embodiment, the micro reforming unit 42 is provided and the fuel 18 is supplied to the power generation cell 43 after being reformed. However, the power generation module may be a direct type power generation cell which directly supplies fuel to the power generation cell 43 from the first and the second fuel containers 1A and 1B without having the micro reforming unit 42 provided.

In the lock mechanism 3A or 3B of the above described embodiment, the lock is released at the same time when the electrode 35A and 35A or the electrodes 35B and 35B become non-conductive with the contact portions 341A and 341A or the contact portions 341B and 341B, respectively, and the IC chip I/F 28A or 28B writes the data of the corresponding first fuel container 1A or the second fuel container 1B right after the lock is released. However, the locked condition may be maintained even when the electrodes 35A and 35A or the electrodes 35B and 35B become non-conductive with the contact portions 341A and 341A or the contact portions 341B and 341B.

Figure 13B:
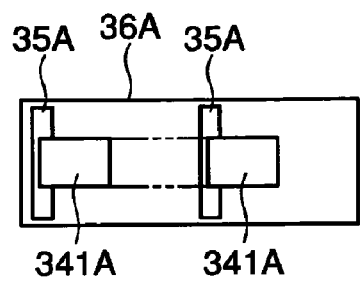
FIG. 13B is a front view showing a state where the contact portions 341A and 341A of the connecting unit 34A are connected to the electrode 35A in the condition shown in FIG. 13A.
Figure 13A:
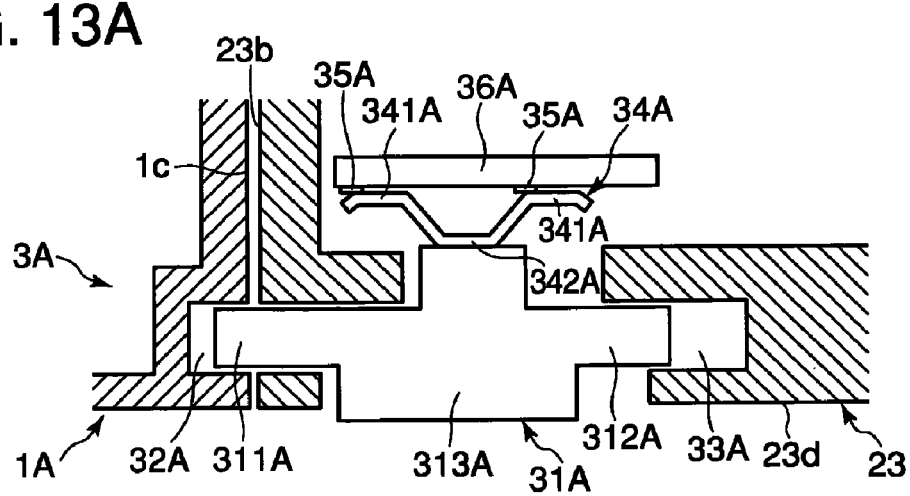
FIG. 13A is an upper sectional view showing the locked state where the lock unit 31A of the lock mechanism 3A is engaged with the first fuel container 1A.
Figure 14B:
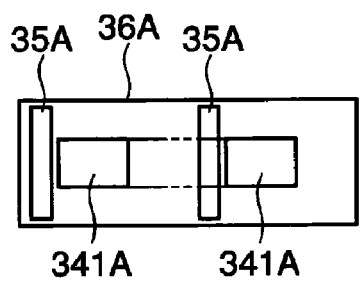
FIG. 14B is a front view showing a state where the contact portions 341A and 341A of the connecting unit 34A are detached from the electrode 35A in the condition shown in FIG. 14A.
Figure 14A:
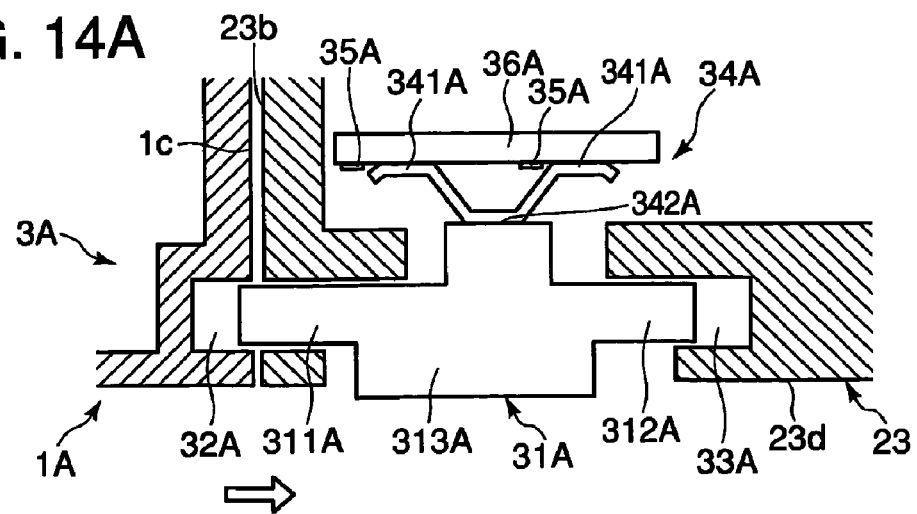
FIG. 14A is an upper sectional view showing a state where the lock of the first fuel container 1A is not released by the lock unit 31A of the lick mechanism 3A by sliding the lock unit 31A which is shown in FIG. 13A and where the contact portions 341A and 341A of the connecting unit 34A are detached from the electrodes 35A and 35A and are non-conductive.
Figure 15B:
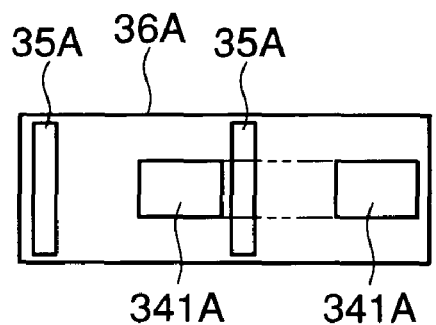
FIG. 15B is a front view showing a state where the contact portions 341A and 341A of the connecting unit 34A are detached from the electrode 35A in the condition shown in FIG. 15A.
Figure 15A:
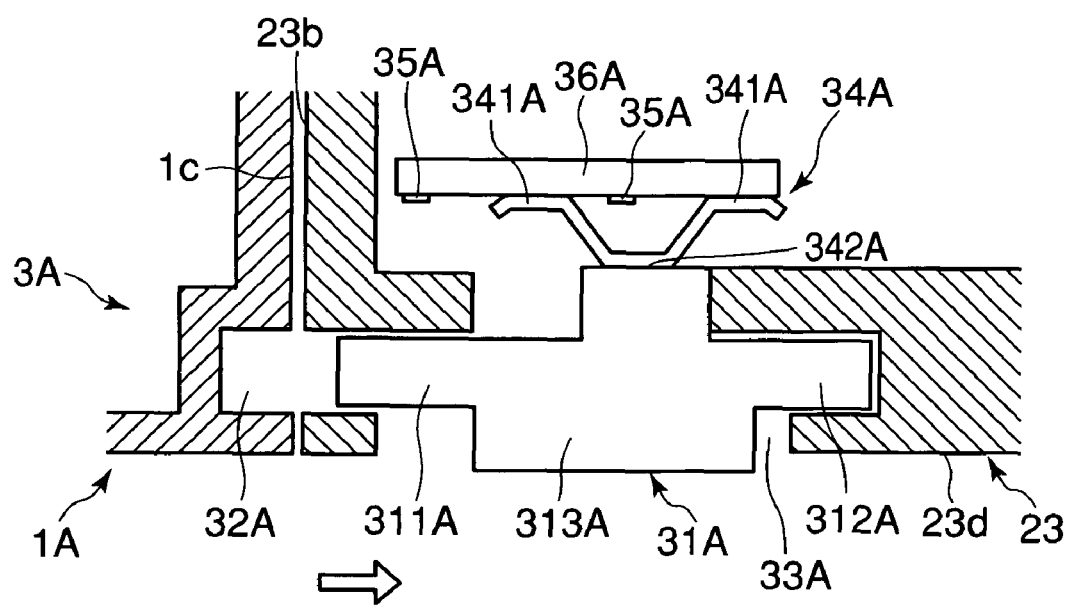
FIG. 15A is an upper sectional view showing a state where the lock of the first fuel container 1A is released by the lock unit 31A of the lock mechanism 3A by further sliding the lock unit 31A which is shown in FIG. 14A.

That is, the lock mechanisms 3A and 3B may set so as to have three modes which are the locked and conductive mode in which the first fuel container 1A or the second fuel container 1B is in the locked condition by the lock unit 31A or 31B and in which the electrodes 35A and 35A or the electrodes 35B and 35B are in the conductive (contact) condition with the contact portions 341A and 341A or the contact portions 341B and 341B as shown in FIGS. 13A and 13B, the locked and non-conductive mode in which the first fuel container 1A or the second fuel container 1B is in the locked condition by the lock unit 31A or 31B by sliding the lock unit 31A or 31B and in which the electrodes 35A and 35A or the electrodes 35B and 35B are in the non-conductive (non-contact) condition with the contact portions 341A and 341A or the contact portions 341B and 341B as shown in FIGS. 14A and 14B and the lock released and non-conductive mode in which the lock of the first fuel container 1A or the second fuel container 1B is in a lock release condition by the lock unit 31A or 31B by further sliding the lock unit 31A or 31B and in which and in which the electrodes 35A and 35A or the electrodes 35B and 35B are in a non-conductive (non-contact) condition with the contact portion 341A and 341A or the contact portions 341B and 341B as shown in FIGS. 15A and 15B.

That is, as soon as the lock mechanism becomes in the lock and non-conductive mode as shown in FIGS. 14A and 14B, the IC chip I/F 28A or 28B which is the data recording unit is set so as to write the data such as the remaining amount of the fuel 18 and the water 19 in the first fuel container 1A or the second fuel container 1B, the number of times of attachment, the date and time of use and the like in the IC chip 15A or 15B.

Therefore, the first fuel container 1A or the second fuel container 1B is maintained to be locked even when the electrodes 35A and 35A or the electrodes 35B and 35B are in the non-conductive condition with the contact portions 341A and 341A or the contact portions 341B and 341B, that is, a time lag of moving to the condition shown in FIGS. 15A and 15B from the condition shown in FIGS. 14A and 14B occurs. Therefore, when writing of data is started after the lock mechanism is in the condition shown in FIGS. 14A and 14B and when the writing of data is competed before the lock mechanism is in the lock released and non-conductive mode as shown in FIGS. 15A and 15B, there is no chance that the first fuel container 1A or the second fuel container 1B is detached during the writing because the first fuel container 1A or the second fuel container 1B is locked while data is being written.

What is claimed is:

1. A power generation system, comprising:
an attachment part to attach a fuel container which stores a fuel, wherein the fuel container includes a storage medium;
a control circuit to detect whether the fuel container is attached to the attachment part;
a data recording unit to record data in the storage medium of the fuel container in accordance with a detection result of the control circuit, wherein the data includes a remaining amount of the fuel in the fuel container,
a lock mechanism including a lock unit to lock the fuel container at the attachment part and a lock recognizing unit to detect a lock or a lock release of the fuel container which is attached to the attachment part; and
a lock mechanism operation unit to operate the lock mechanism;
wherein the data recording unit stores the data in the storage medium in response to a detection of the lock release by the lock recognizing unit in a state in which the fuel container is attached to the attachment part;

wherein the lock mechanism operation unit is provided on one surface of the power generation system; and wherein the fuel container is attached to the attachment part by being moved in a direction toward a back surface of the one surface of the power generation system from a side of the one surface of the power generation system.

2. The power generation system as claimed in claim 1, wherein the data further includes at least one of a number of times of attaching the fuel container, and a date and time of using the fuel container.

3. The power generation system as claimed in claim 1, wherein the data recording unit reads the data from the storage medium of the fuel container.

4. The power generation system as claimed in claim 1, wherein the control circuit stops a supply of the fuel from the fuel container when the lock recognizing unit detects the lock release.

5. The power generation system as claimed in claim 1,
wherein the lock unit comprises a connecting unit which is positioned at different positions when the fuel container is locked and when the lock of the fuel container is released, and wherein the lock recognizing unit enters into an electrically conductive condition with the connecting unit when the fuel container is locked by the lock unit and enters into an electrically non-conductive condition with the connecting unit when the lock of the fuel container is released by the lock unit.

6. The power generation system as claimed in claim 1,
wherein the lock unit comprises a connecting unit which is positioned at different positions when the fuel container is locked and when the lock of the fuel container is released, wherein the lock recognizing unit comprises a plurality of electrodes which are non-conductive with one another, and wherein the connecting unit makes the plurality of electrodes electrically connect to one another when the fuel container is locked by the lock unit and the connecting unit makes the plurality of electrodes release the electrical connection when the lock of the fuel container is released by the lock unit.

7. The power generation system as claimed in claim 1, wherein the lock unit locks the fuel container by engaging with an engaging hole which is provided in the fuel container.

8. The power generation system as claimed in claim 1, wherein the lock unit is positioned at different positions when the fuel container is locked and when the lock is released,
wherein the lock recognizing unit enters into one of an electrically conductive condition and an electrically non-conductive condition according to the position of the lock unit, and wherein the control circuit detects whether the fuel container is locked or the lock is released by recognizing the conductive condition or the non-conductive condition of the lock recognizing unit.

9. The power generation system as claimed in claim 1, wherein the control circuit stops a supply of the fuel from one fuel container among a plurality of fuel containers attached to the attachment part when a lock release of the one fuel container is detected, and starts supply of the fuel from another fuel container from among the plurality of fuel containers.

10. The power generation system as claimed in claim 1, wherein the power generation system is provided in an electronic device.

11. A power generation system, comprising:
an attachment part to attach a fuel container which stores a fuel, wherein the fuel container includes a storage medium;

a control circuit to detect whether the fuel container is attached to the attachment part;

a data recording unit to record data in the storage medium in accordance with a detection result of the control circuit, wherein the data includes a remaining amount of the fuel in the fuel container;

a lock unit to lock the fuel container to the attachment part;

a lock release start recognizing unit to detect when the lock unit starts to release the lock of the fuel container; and a lock operation unit to operate the lock unit;

wherein the data recording unit records the data in the storage medium of the fuel container in response to a detection of a start of the lock release by the lock release start recognizing unit after the lock release of the fuel container is started and before the lock release is completed;

wherein the lock operation unit is provided on one surface of the power generation system; and wherein the fuel container is attached to the attachment part by being moved in a direction toward a back surface of the one surface of the power generation system from a side of said one surface of the power generation system.

12. The power generation system as claimed in claim 11,
wherein the lock unit comprises a connecting unit which is positioned at different positions when the fuel container is locked and when the lock of the fuel container is started to be released, and wherein the lock release start recognizing unit enters into an electrically conductive condition with the connecting unit when the fuel container is locked by the lock unit and enters into an electrically non-conductive condition with the connecting unit when the lock of the fuel container is started to be released by the lock unit.

13. The power generation system as claimed in claim 11,
wherein the lock unit comprises a connecting unit which is positioned at different positions when the fuel container is locked and when the lock of the fuel container is started to be released, wherein the lock release start recognizing unit comprises a plurality of electrodes which are electrically non-connective to one another, and wherein the connecting unit allows the plurality of electrodes to electrically connect to one another when the fuel container is locked by the lock unit, and the connecting unit allows the plurality of electrodes to release the electrical connection when the lock of the fuel container is started to be released by the lock unit.

14. The power generation system as claimed in claim 11, wherein the lock unit locks the fuel container by engaging with an engaging hole which is provided in the fuel container.

15. The power generation system as claimed in claim 11, wherein the power generation system is provided in an electronic device.

* * * * *